US008204857B2

(12) United States Patent
Held (10) Patent No.: US 8,204,857 B2
(45) Date of Patent: Jun. 19, 2012

(54) TABLE ANALYZER FOR SOLUTION TRANSITION EVENTS

(75) Inventor: Dominik Held, Waghaeusel (DE)

(73) Assignee: SAP AG, Walldorf (DE)

( * ) Notice: Subject to any disclaimer, the term of this patent is extended or adjusted under 35 U.S.C. 154(b) by 446 days.

(21) Appl. No.: 12/512,269

(22) Filed: Jul. 30, 2009

(65) Prior Publication Data

US 2011/0029483 A1 Feb. 3, 2011

(51) Int. Cl.
*G06F 7/00* (2006.01)
*G06F 17/00* (2006.01)
(52) U.S. Cl. .................. 707/634; 707/638; 707/695
(58) Field of Classification Search .................. 707/634, 707/638, 695
See application file for complete search history.

(56) References Cited

U.S. PATENT DOCUMENTS

| 6,643,648 B1* | 11/2003 | Ross et al. ............. 707/695 |
| 2008/0155386 A1* | 6/2008 | Jensen ............... 715/201 |
| 2009/0119501 A1* | 5/2009 | Petersen ............. 713/100 |
| 2009/0144743 A1* | 6/2009 | Wolslegel ............. 718/105 |

OTHER PUBLICATIONS

'Domains' [online]. SAP Library, [retrieved on Jul. 25, 2009]. Retrieved from the Internet: <URL: http://help.sap.com/saphelp_nw70/helpdata/EN/cf/21ede5446011d189700000e8322d00/content.htm>, 2 pages.
'Data Elements' [online]. SAP Library, [retrieved on Jul. 25, 2009]. Retrieved from the Internet: <URL: http://help.sap.com/saphelp_nw70/helpdata/EN/90/8d72feblaf11d194f600a0c929b3c3/content.htm>, 2 pages.
'Data Types' [online]. SAP Library, [retrieved on Jul. 25, 2009]. Retrieved from the Internet: <URL: http://help.sap.com/saphelp_nw04/Helpdata/EN/fc/eb2fcc358411d1829f0000e829fbfe/content.htm>, 5 pages.
'Editing Tables and Indexes in the Database' [online]. SAP Library, [retrieved on Jul. 25, 2009]. Retrieved from the Internet: <URL: http://help.sap.com/saphelp_nw04/helpdata/en/cf/21f0f0446011d189700000e8322d00/content.htm>, 2 pages.
'Creating Indexes' [online]. SAP Library, [retrieved on Jul. 25, 2009]. Retrieved from the Internet: <URL: http://help.sap.com/saphelp_nw04/helpdata/EN/cc/7c58b369022e46b629bdd93d705c8c/content.htm>, 1 page.
'Creating a Database View' [online]. SAP Library, [retrieved on Jul. 25, 2009]. Retrieved from the Internet: <URL: http://help.sap.com/saphelp_nw70/helpdata/en/cf/21ed06446011d189700000e8322d00/content.htm>, 2 pages.
'Create VIEW Statement' [online]. SAP Library, [retrieved on Jul. 25, 2009]. Retrieved from the Internet: <URL: http://www.sapdb.org/7.4/htmhelp/6d/117c44d14811d2a97400a0c9449261/content.htm>, 2 pages.

* cited by examiner

*Primary Examiner* — Don Wong
*Assistant Examiner* — Merilyn Nguyen
(74) *Attorney, Agent, or Firm* — Fish & Richardson P.C.

(57) ABSTRACT

Certain implementations provide systems, computer program products, computing devices, and methods to analyze how a preexisting database will be affected during a solution transition event (e.g., upgrading a database to a new version). Analysis can be conducted before the solution transition event has occurred. Analysis can yield a report detailing how upgrading will affect the data and data structures contained within a preexisting database system. The database system being analyzed can be part of a broader system upon which the solution transition event is performed. Analyzing how the solution transition event will affect a database system can be performed in preparation for performing the solution transition event on the broader system.

20 Claims, 9 Drawing Sheets

TABLE ANALYZER FOR SOLUTION TRANSITION EVENTS

TECHNICAL FIELD

This document relates to analyzing a solution transition event.

BACKGROUND

A solution transition event can be performed on a computer system to change the computer system (e.g., upgrade the computer system). Computer systems can have integrated and/or associated databases which may be affected by a solution transition event. Databases can be used by and integrated into a variety of computing systems for providing ready access to stored information. The data structures within which databases store and organize information can vary. For example, relational databases can store data as entries in tables that have fields. Databases can store massive amounts of data (e.g., petabytes of data) which can have corresponding massive data structures. Performing a solution transition event on a database (e.g., upgrading a database from an older version to a newer version) can involve modifying the data structures that are used by the database. For instance, upgrading a relational database may involve adding a table and/or adding a field to a table.

SUMMARY

This document generally relates analyzing a solution transition event.

Certain implementations provide systems, computer program products, computing devices, and methods to analyze how a preexisting database will be affected during a solution transition event (e.g., upgrading a database to a new version). Analysis can be conducted before the solution transition event has occurred. Analysis can yield a report detailing how upgrading will affect the data and data structures contained within a preexisting database system. The database system being analyzed can be part of a broader system upon which the solution transition event is performed. Analyzing how the solution transition event will affect a database system can be performed in preparation for performing the solution transition event on the broader system.

In one implementation, a method for analyzing a solution transition event includes receiving a request to analyze how upgrading a preexisting database system to another version of the preexisting database system will affect components of the preexisting database system. The request can identify the preexisting database system and the other version of the preexisting database system. The method can further include identifying by a first computing device the components of the preexisting database system by analyzing configuration information for the preexisting database system, the configuration information for the preexisting database system being analyzed while the preexisting database system is operational, wherein the components of the preexisting database system comprise tables, fields, data types, indices, data elements, and attributes of the preexisting database system. The method can additionally include identifying by the first computing device components of the other version of the preexisting database system by analyzing configuration information for other version of the preexisting database system, wherein the components of the other version of the preexisting database system comprise tables, fields, data types, indices, data elements, and attributes of the other version of the preexisting database system. The method can also include determining by the first computing device changes to the components of the preexisting database system that upgrading from the preexisting database system to the other version of the database system will cause based upon a comparison of the identified components of the preexisting database system and the identified components of the other version of the preexisting database system; generating a report indicating the determined changes; and presenting the generated report.

Implementations can provide any or all of the following advantages. Analysis can prospectively identify complications (e.g., incompatible data types) that may arise during a solution transition event. Instead of encountering problems during a solution transition event, problems can be identified and addressed in advance to allow for a complication-free solution transition event. Additionally, prospective identification of complications associated with solution transition events can provide insight into a degree of complexity associated with the solution transition event. For example, prospective identification of complications can provide a basis for estimating a level of severity and/or an amount of time associated with performing various portions of a solution transition event. Such information can be useful in determining how and when to deploy a solution transition event.

Further advantages can include the ability to prospectively obtain information associated with a solution transition event from a preexisting database system that is running—downtime to analyze a preexisting database system is not needed. Such information can additionally be obtained remote from the preexisting database system.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
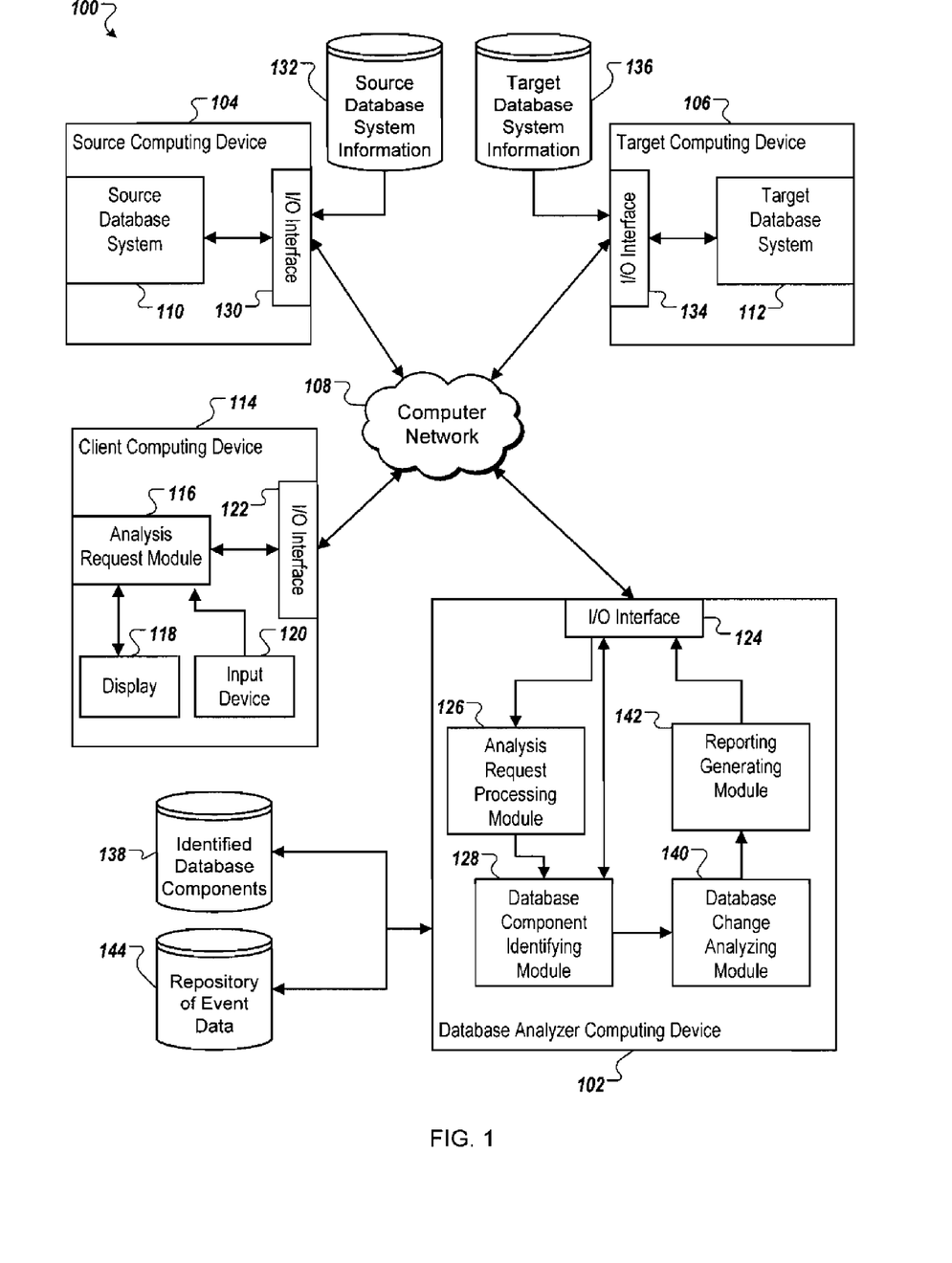
FIG. 1 is a block diagram of an example computing system that can be used to analyze how a preexisting database will be affected by a solution transition event.

FIG. 1 is a block diagram of an example computing system 100 to analyze how a preexisting database will be affected by a solution transition event. The example system 100 depicts database analyzer computing device 102 that is configured to analyze how a solution transition event will affect a source computing device 104. The solution transition event (e.g., upgrade to a new database version, configuration of a database, etc.) can transition the source computing device 104 to a state of a target computing device 106. For example, if the solution transition event to be performed is an upgrade, the target computing device 106 that contains the new database version and the source computing device 104 that contains the old database version.

The computing devices 102-106 can include any or all of a variety of computing devices, such as a desktop computer, a server computer, a distributed computing device, a portable computing device (e.g., a laptop, a mobile phone), etc. The computing devices 102-106 can be communicatively connected over a computer network 108. The computer network 108 can include any or all of a variety of computer networks, such a as a local area network (LAN), a wide area network (WAN), a wireless network, a point-to-point network, the Internet, a hard-wired network (e.g., a system bus), etc. In some implementations, some or all of the computing devices 102-106 are part of the same computing device.

The source computing device 104 includes a source database system 110 and the target computing device 106 includes a target database system 112. The source database system 110 can be a part of the source computing device 104 that may be affected by a solution transition event performed on the source computing device 104. The database analyzer computing device 106 is configured to determine how a solution transition event will affect the source database system 110. For example, the database analyzer computing device 106 can determine that upgrading (an example of a solution transition event) the source database system 110 (e.g., version 5.6 of the database system) on the source computing device 104 to the target database system 112 (e.g., version 7.3 of the database system) can cause three tables to be added to and one table to be deleted from the source database system 110. Instead of looking at the solution transition event itself the database analyzer computing device 106 treats the source database system 110 as the starting point for the solution transition event and the target database system 112 as the end point for the event. The database analyzer computing device 106 analyzes the affect of the solution transition event by examining the differences that between the source database system 110 and the target database system 112.

The source database system 110 can include or be part of the live database system upon which the solution transition event is to be performed. For example, the source database system 110 may be an enterprise resource planning system that is responsible for managing various aspects (e.g., inventory, ordering, etc.) of an enterprise system. The source database system 110 can be used for resource planning.

The target database system 112 can include a demo/test installation of the new version of the source database system 110. While the source database system 110 may be associated with a massive amount of data (e.g., data for an enterprise resource planning system), the target database system 112 can include a newly installed version that is not yet associated with much, if any, data.

The source database system 110 and the target database system 112 can include any or all of a variety of database systems (e.g., relational database system, object-oriented database system, etc.). Depending on the type of database system, the source database system 110 and the target database system 112 can contain various data structures which are used to store and organize information. For example, relational databases can store data as entries in tables that have fields. Each field of a table can be associated with a data type (and/or data element) and can have a variety of attributes (e.g., indicator whether the field is a key field, value at initialization, etc.). Additionally, each table can have assigned indices that index data within a table according to one or more fields. Relational database tables can be related and linked together in a variety of manners, such as through two or more tables storing related data fields, two or more tables sharing/inheriting data types, etc.

The source database system 110 and the target database system 112 may be able to store massive amounts of data (e.g., petabytes of data) and to have correspondingly large data structures. Referring to the relational database example above, a relational database storing on the order of a petabyte of information may have hundreds of thousands of tables, each of which may have numerous fields and entries.

To arrive at the target database system 112 by performing a solution transition event on the source database system 110 (e.g., upgrading from the source database system 110 to the target database system 112) can involve modifying the data structures that are used by the source database system 110. Referring to the relational database example again, upgrading to a new relational database may involve a variety of modifications to the table database structure, such as adding and/or deleting tables, adding and/or deleting fields in a table, modifying data types and/or data elements for fields, etc. Among a variety of tasks, the database analyzer computing device 102 can determine how the data structures of the source database system 110 will be affected by a solution transition event having the target database system 112 as an end point.

The system 100 can also include a client computing device 114 that is communicatively connected to the devices 102-106 via the network 108. The client computing device 114 can be responsible for issuing a request to analyze how a transition event will affect the source database system 110. The client computing device 114 can include any or all of a variety of computing devices similar to the computing devices 102-106 (e.g., desktop computer, portable computing device, etc.). In some implementations, the client computing device 114 and some, or all, of the computing devices 102-106 are part of the same computing device.

The client computing device 114 includes an analysis request module 116 that is configured to issue requests to analyze how a solution transition event will affect the source computing device 104. The analysis request module 116 can be connected to a display 118 and to an input device 120, through which instructions from a user may be received. The analysis request module 116 is connected to an input/output (I/O) interface 122 that is capable of transmitting a formulated analysis request to the database analyzer computing device 102. The I/O interface can include any or all of a variety of networking interfaces, such as an Ethernet card, an integrated wireless networking interface 122, etc.

The database analyzer computing device 102 receives an analysis request from the client computer 114 via an I/O interface 124 (similar to the I/O interface 122) and forwards the received request to an analysis request processing module 126. The analysis request processing module 126 can identify the type of solution transition event (e.g., upgrade, modification of database, etc.) for which analysis is requested. In some implementations, the analysis request processing module 126 additionally instructs installation of the target database system 112 on the target computing device 106 for the purpose of performing the requested analysis.

The analysis request processing module 126 informs a database component identifying module 128 of the request. The database component identifying module 128 identifies the various components (e.g., tables, fields, data types, data elements, indices, attributes, data type lengths, etc.) of the source database system 110 and of the target database system 112. The database component identifying module 128 can use the I/O interface 124, the computer network 108, and an I/O interface 130 of the source computing device 104 to retrieve component information from the source computing device 104.

Component information for the source database system 110 includes information that defines components and other configurations of the source database system 110. Component information can be retrieved from a variety of locations on the source computing device 104, such as from configuration files for the source database system 110 (e.g., files defining components of the source database system 110), from running processes for the source database system 110 (e.g., querying a process of the source database system 110 for component information), from metadata associated with the data of the source database system 110 (e.g., data defining the components and data structures of the source database system 110), etc. Retrieving this information can involve tracing references to component information (e.g., table definitions, field definitions, etc.) until the desired component information is located. The component information may be retrieved from a repository of source database system information 132 (e.g., a repository storing configuration information, metadata associated with the source database system 110, etc.) that is connected to the source computing device 104.

The database component identifying module 128 can use the I/O interface 124, the computer network 108, and an I/O interface 134 of the target computing device 106 to retrieve component information from the source computing device 106. Component information for the target database system 112 can be similar to the component information for the source database system 110 and can be retrieved in a similar manner. The component information for the target dataset system 112 may be retrieved from a repository of target database system information 136 that is connected to the target computing device 106.

The database component identifying module 128 can store the retrieved component information for the source database system 110 and/or the target database system 112 in a repository of identified database components 138. When completed obtaining all necessary component information, the database component identifying module 128 can instruct the database change analyzing module 140 to begin analyzing the how the source database system 110 will be affected by the solution transition event for which the target computing device 106 is an end point (e.g., the resulting system after applying the solution transition event to the source database system 110). The database change analyzing module 140 can identify changes that will take place to the source database system 110 by comparing the various components stored in the identified database components 138 for the database system 110-112. For example, changes identified by the database change analyzing module 140 can include additions, modifications, and deletions of tables, fields, indices, data types, data elements, field attributes, data type lengths, etc.

Once the changes have been identified, the database change analyzing module 140 can instruct the report generating module 142 to create a report summarizing the changes caused by the solution transition event. The report generated can include information at varying levels of scope (e.g., high-level overview of the changes, detailed list of every change, etc.). The report generated can also include information regarding a level of severity and/or an amount of time associated with performing various portions of a solution transition event. The report generating module 142 may reference a repository of solution event data 144 containing information that indicates a severity level and length of time to implement various changes during the solution transition event. The report generating module 142 can return the generated report to the analysis request module 116 of the client computing device 114 via the I/O interface 124, the computer network 108, and the I/O interface 122. The analysis request module 116 can present the generated report via the display 118.

FIGS. 2A-E are block diagrams schematically showing example steps performed by a computing system to analyze how a preexisting database system will be affected by a solution transition event. As described above with regard to FIG. 1, the solution transition event can be performed on a computer system (e.g., upgrade to from an older to a newer computing system). A preexisting database system that is part of the computer system can be analyzed to determine how the database system will be affected by the solution transition event. The steps depicted in the FIGS. 2A-E may be similar to steps those described above with regard to FIG. 1. The steps depicted in the FIGS. 2A-E may be performed by any of a variety of systems, including the system 100 described with regard to FIG. 1. The example database system depicted in the FIGS. 2A-E has a table-based data structure (e.g., a relational database system).

Figure 2A:
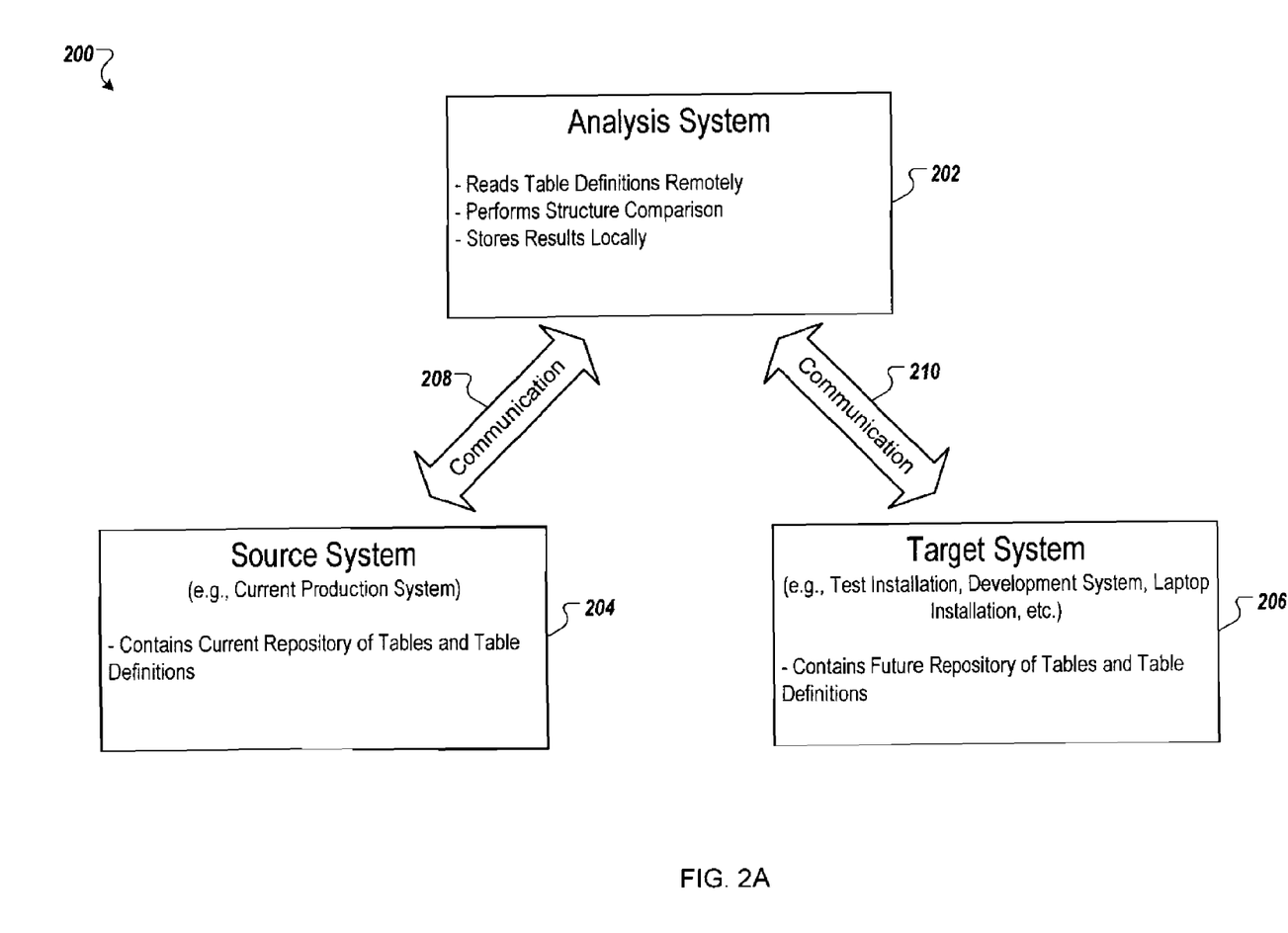
FIGS. 2A-E are block diagrams of example steps performed by a computing system to analyze how a preexisting database system will be affected by a solution transition event.

FIG. 2A depicts an example step 200 in which an analysis system 202 (e.g., the database analyzer computing device 102) initiates remote retrieval of table definitions for both a source system 204 (e.g., the source computing device 104) and a target system 206 (e.g., the target computing device 106). The analysis system 202 can analyze how the source system 204 will be affected by a solution transition event, where the end point for the solution transition event is the target system 206 (e.g., a system having the structure of the target system 206 will be produced by performing the solution transition event on the source system 204). The analysis system 202 can retrieve the table definitions (e.g., database components) from the source system 204 via remote communication 208. Similarly, the analysis system 202 can retrieve the table definitions (e.g., database components) from the target system 206 via remote communication 210.

The source system 204 can include a current production system (e.g., a system that is currently being used for enterprise resource management) that contains current repositories of tables and table definitions. The target system 206 can include a demo installation (e.g., a test installation, a development system installation, a laptop installation, etc.) that contains the future repositories of tables and table definitions.

Once the table definitions (e.g., database components) for the source system 204 and the target system 206 have been retrieved, the analysis system 202 can perform a structural comparison of the two systems. Such a comparison can involve a variety of comparisons, such as identifying new fields in the target system 206, identifying deleted fields from the source system 204, identifying key-field changes and new indices, etc. The results of such a comparison can be stored locally for use in generating reports.

Figure 2B:
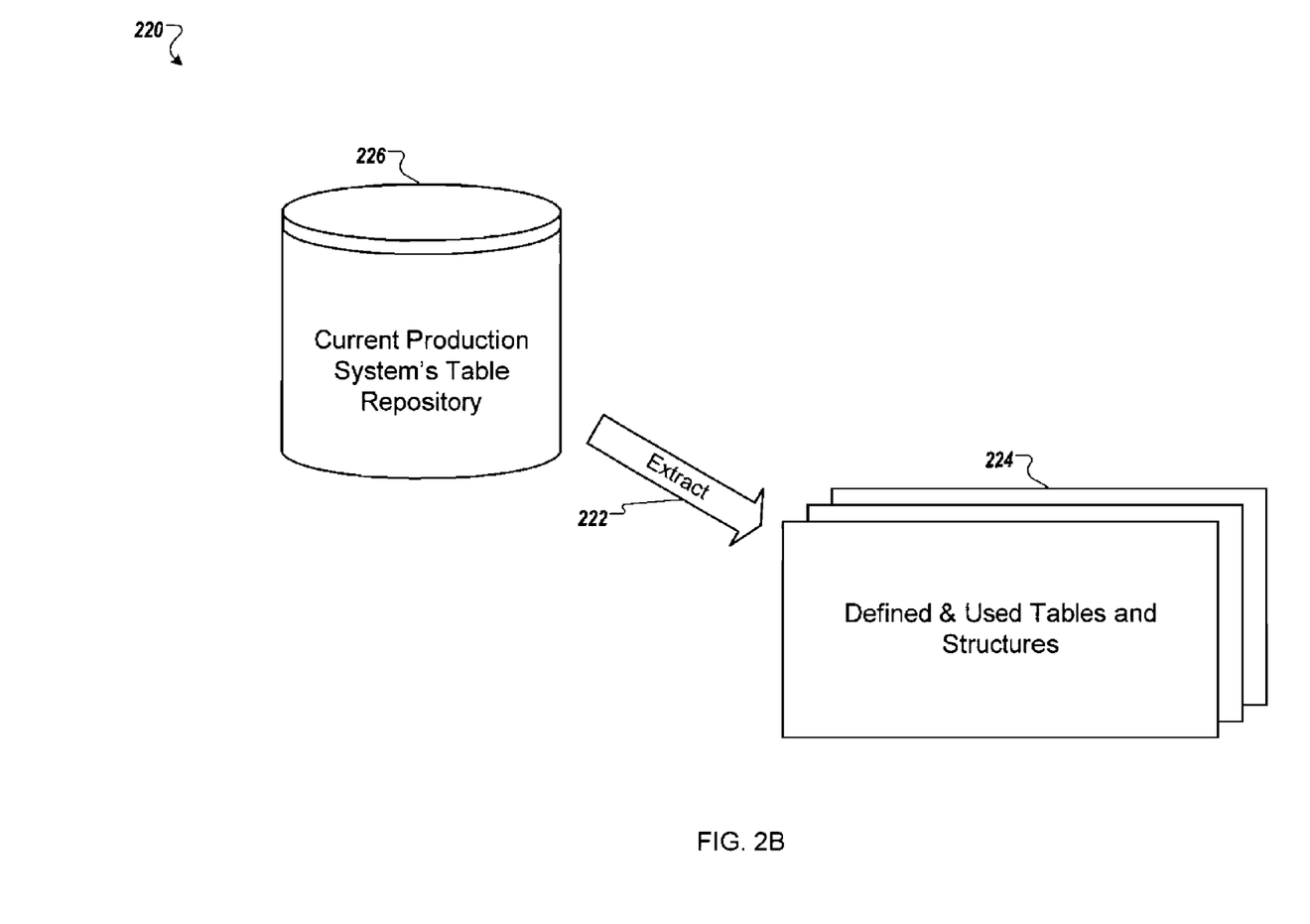

FIG. 2B depicts an example step 220 where the analysis system 202 extracts 222 the defined tables and structures 224 from the current production system's (e.g., the source system 204) table repository 226. The table repository can include a repository that stores working definitions of tables and other data structures used by the source system 204. As described above with regard to FIG. 1, database components (e.g., table and data structure definitions) can be extracted in a variety of other ways as well.

Figure 2C:
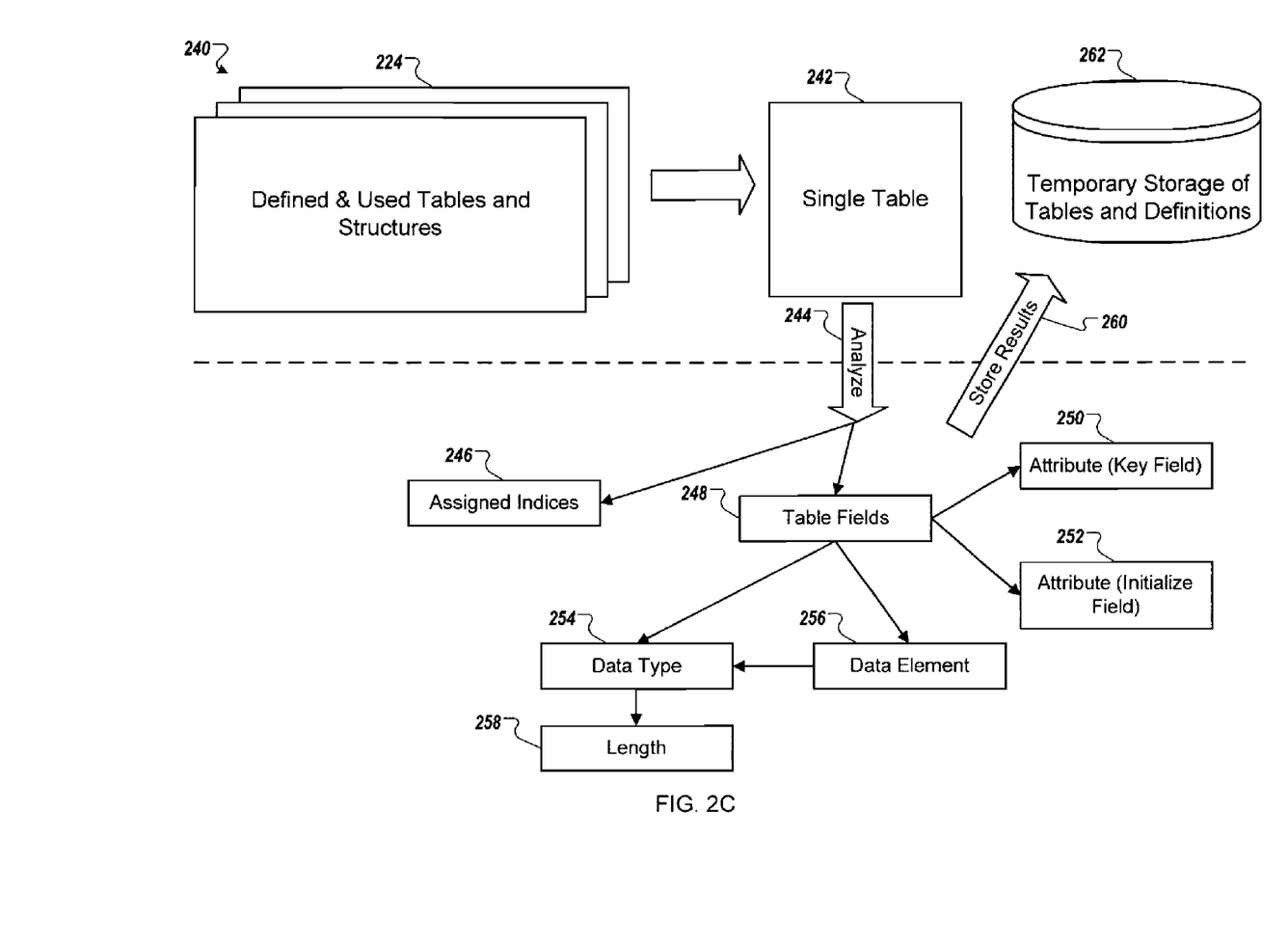

FIG. 2C depicts an example step 240 for identifying the components of a single table for the source system 204. The step 240 can be performed for each of the defined tables and structures 224 extracted 222 from the source system's 204 table repository 226.

For a single table 242, the table 242 is analyzed 244 by tracing the definitions for the components of the table 242. The analysis 244 can be performed by tracing configuration and definition data located on the source system 204. A variety of components can be identified through tracing. Tracing can involve several levels of component discovery. For instance, the single table 242 can be traced to assigned indices 246 and fields 248 for the table. Each table field 248 can, in turn, be traced to key field attributes 250 (e.g., whether a field is a key or primary field), initialize field attributes 252 (e.g., default value for a field), data types 254 (e.g., integer, character, etc.), and data elements 256 (e.g., enumerated data types which can inherit other data types). Each data type 254 can be traced to a data length 258 (e.g., 16-bit field, 32-bit field, 64-bit field, etc.).

The results (the identified components for the table 242) can be stored 260 in a temporary storage of tables 262 (e.g., repository of identified database components 138). The storage of tables 262 can be associated with the analysis system 202.

Figure 2D:
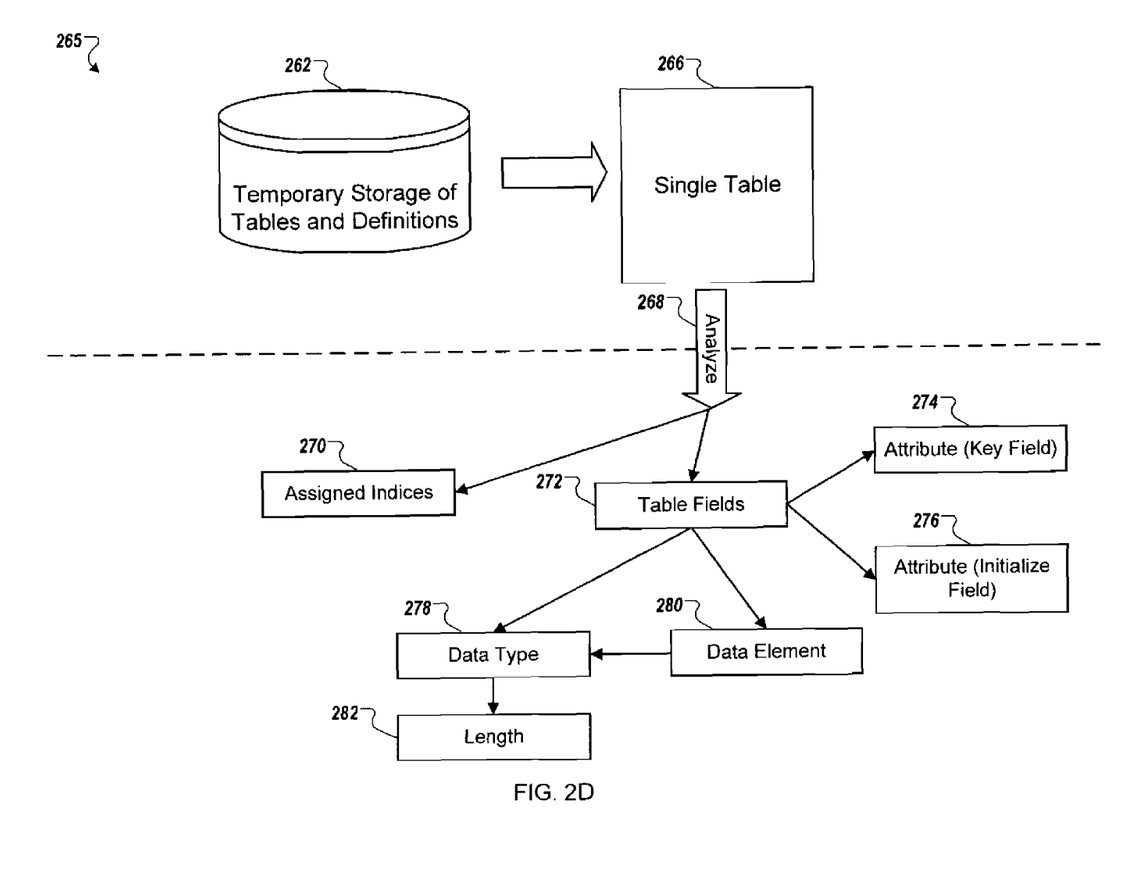

FIG. 2D depicts an example step 265 for identifying the components of a single table for the target system 206. The list of defined tables to trace for the target system 206 can be derived from the results stored in the temporary storage of tables 262 for the source system 204. Using the populated results in the temporary storage of table 262 can produce a list of overlapping tables (tables shared in both the source system 204 and target system 206), tables that are only contained in the source system 204 (e.g., deleted tables), and tables that are only contained in the target system 206 (e.g., new tables).

For each single table 166, analysis 268 can be performed by tracing, similar to the analysis 244 described above. The analysis 268 can be performed by tracing configuration and definition data located on the target system 206. Each table 266 can be traced to assigned indices 270 and table fields 272. Each table field can be traced to key field attributes 274, initialize field attributes 276, data types 278, and data elements 280. Each data type 278 can be traced to a data length 282. The identified data components 270-282 can be stored in temporary storage 262 (not depicted) for use during a comparison step. In some implementations, comparison can be performed by the analysis system 202 while the database components of the target system 206 are being traced.

Figure 2E:
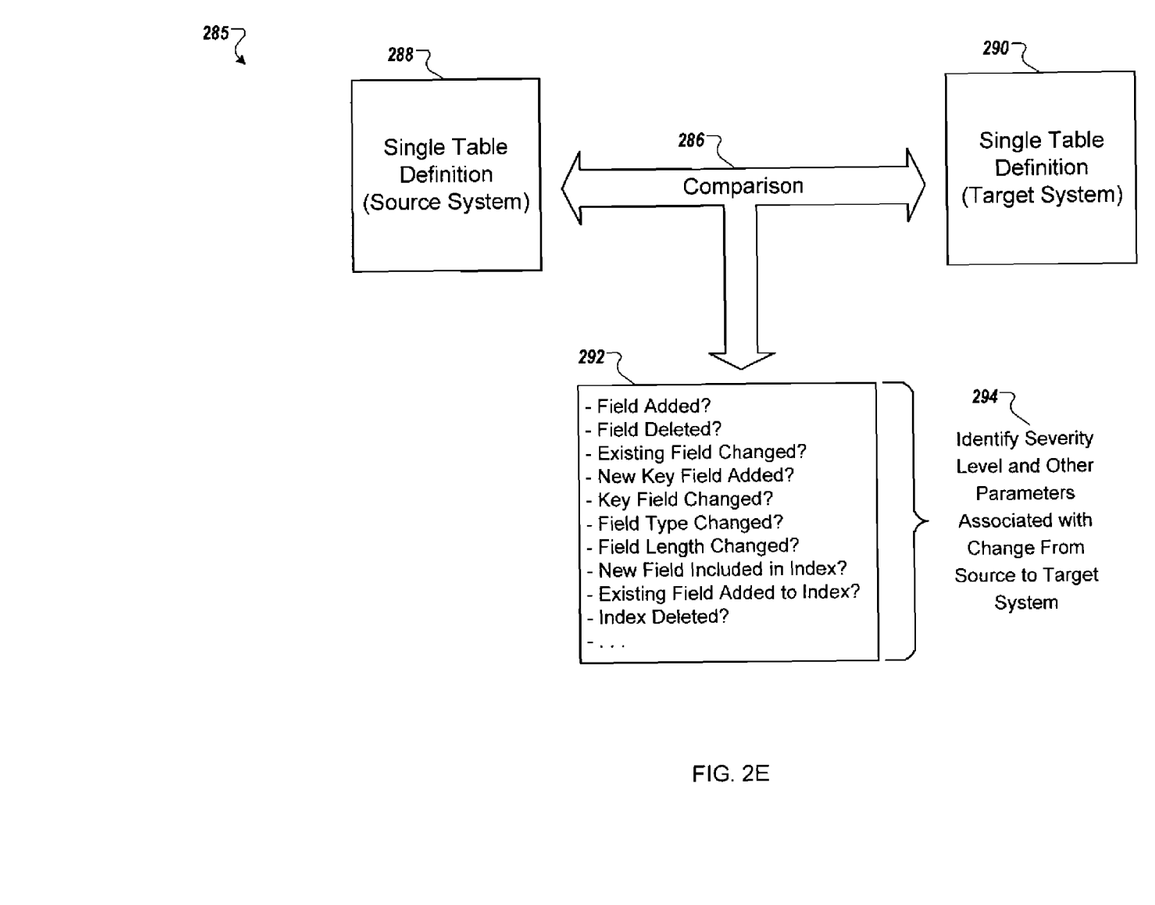

FIG. 2E depicts an example step 285 for identifying changes that will be made to the source system 204 by a solution transition event by comparing 286 table definitions 288 from the source system 204 with table definitions 290 from the target system 206. The definitions 288 and 290 can include the traced definitions derived from the steps 240 and 265, respectively.

The comparison 286 can strive to identify a variety of changes 292 that a solution transition event will produce. For example, the identified changes 292 can include what additions, deletions, and modifications were made to each of the components of each table. The identified changes 292 can also identify table and data structure additions and deletions. A severity level and other parameters (e.g., estimated time to implement each change) can be identified 294 for each change 292.

Figure 3A:
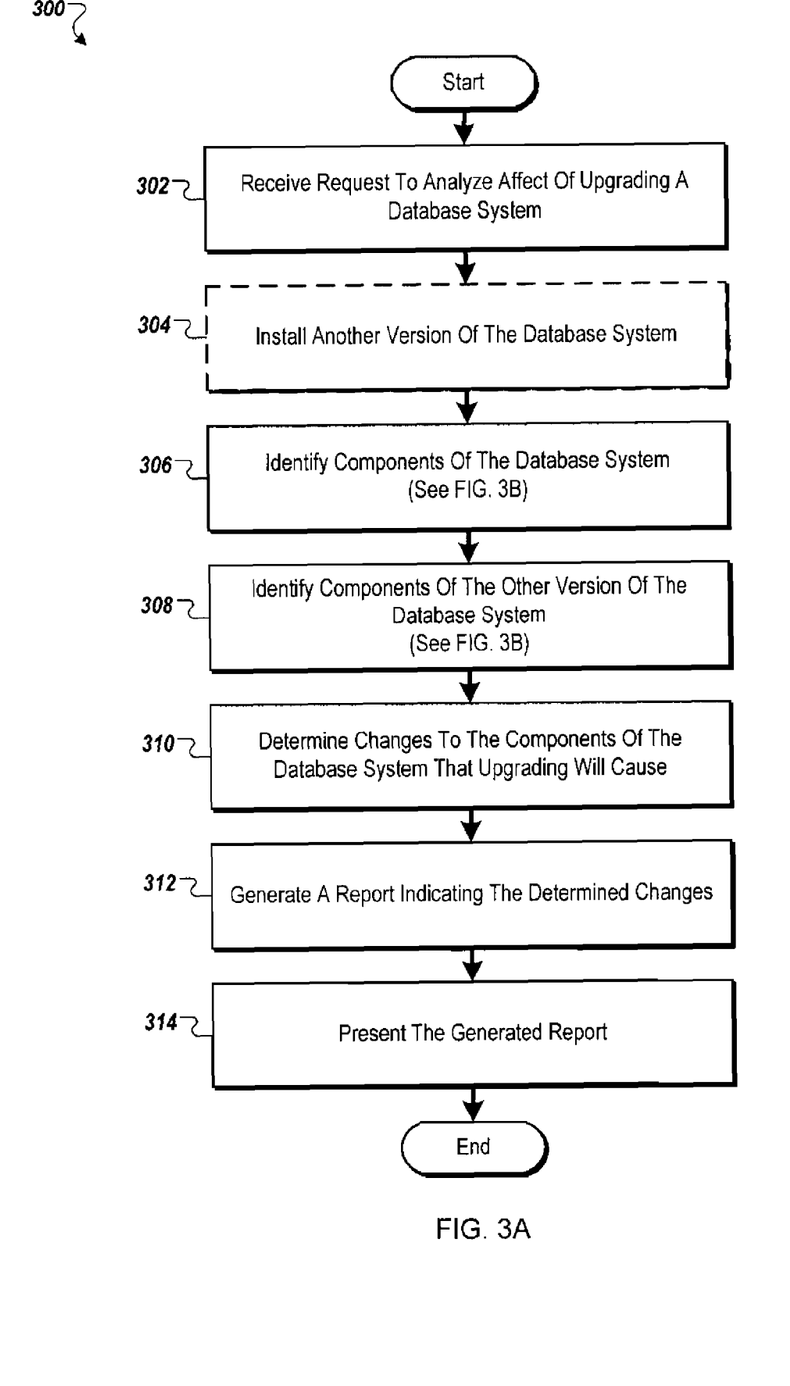
FIGS. 3A-B are schematic diagrams of processes that, when executed, can analyze how a preexisting database will be affected by a solution transition event.
Figure 3B:
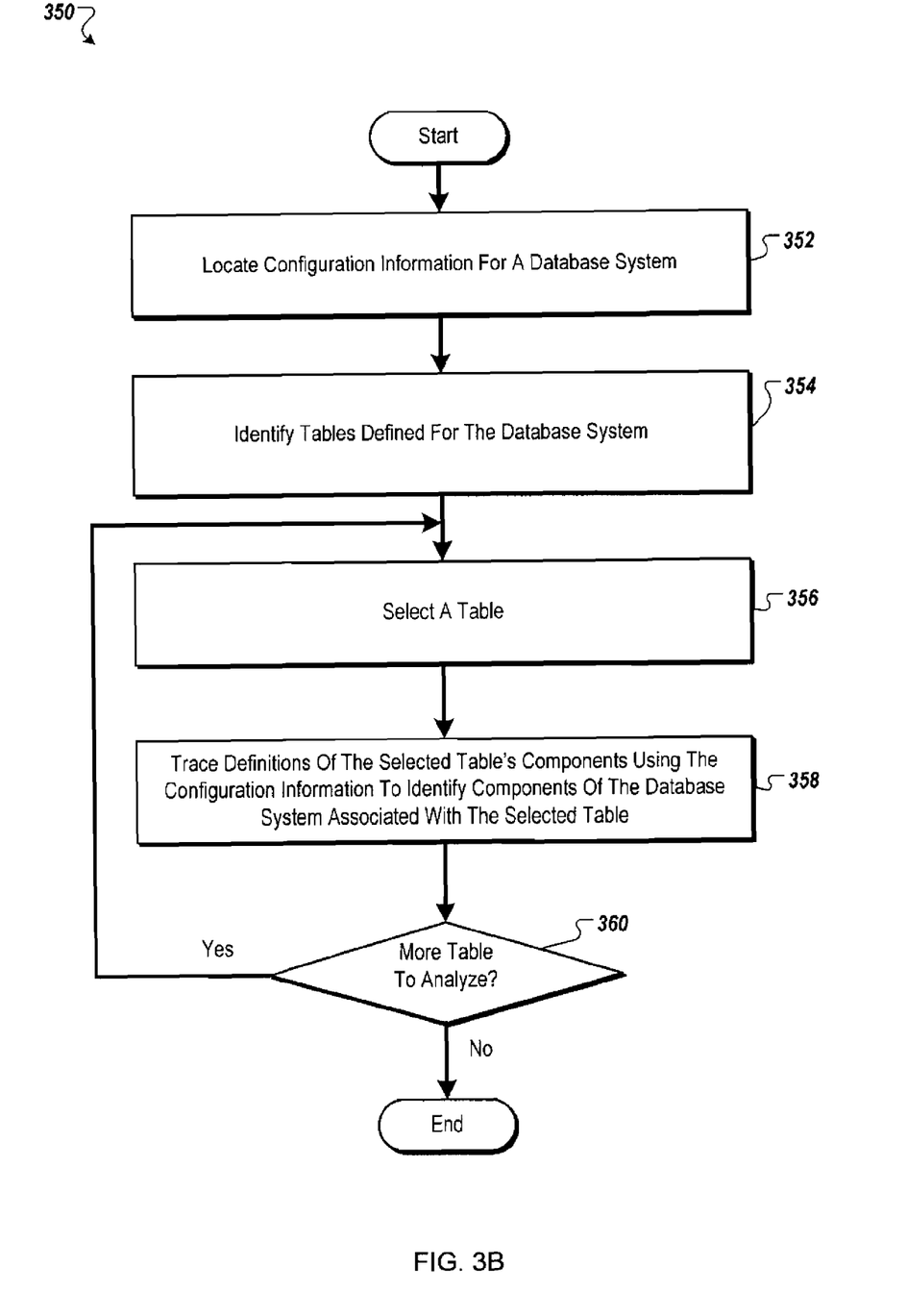

FIGS. 3A-B are schematic diagrams of processes 300 and 350 that, once executed, can analyze how a preexisting database will be affected by a solution transition event. As described above with regard to FIGS. 1 and 2A-E, the solution transition event can be performed on a computer system (e.g., upgrade to from an older to a newer computing system). A preexisting database system that is part of the computer system can be analyzed to determine how the database system will be affected by the solution transition event. The processes 300 and 350 can be implemented using a variety of systems, including the system 100 described above with regard to FIG. 1. Steps of the processes 300 and 350 may be similar to the steps described above with regard to FIGS. 2A-E. The processes 300 and 350 may be performed by an analysis system, such as the database analyzer computing device 102 or the analysis system 202.

FIG. 3A regards generating a report of the changes that will take place in a source system (e.g., the source computing device 104, the source system 204) in light of a solution transition event. In the example process 300, the solution transition event is an upgrade of the source system to a newer database version. Process 300 can begin by receiving a request to analyze how a source database system will be affected by upgrading to a newer version (302). The request may be received as part of a process to analyze how a computer system, of which the preexisting database is a part, will be affected by a solution transition event (e.g., upgrading the computer system to a newer version). In some implementations, another version (e.g., a newer version) of the database system may be installed (304). In other implementations, the other version of the database system may already be installed. This other system can include the target system (e.g., target computing device 106, target system 206).

The components of the source database system can be identified, as described in further detail with regard to FIG. 3B (306). The components of the other database system can be identified using a similar process to identifying components of the source database system (308). Changes to the components of the source database system that will be caused by upgrading to the target system can be determined (310). A report can be generated indicating the determined changes (312). The report can be presented (e.g., displayed, sent to a client computer, etc.) (314).

FIG. 3B regards the process 350 of identifying the components of a database system remotely by tracing definitions and configuration information (e.g., definition and configuration files) associated with the database system. The process 350 can be performed for the source system and/or the target system. The process 350 can begin by locating configuration information for the database system (352). Using the located configuration information, defined tables for the database system can be identified (354). A first table can be selected (356). The definitions for the selected table's components (e.g., fields, attributes, data types, etc.) can be traced using configuration information for the database system to identify components of the database system associated with the selected table (358). The identified components can be stored for comparison against the identified components of the other (source or target) database system. Once tracing has been completed for the table, the identified tables are checked to see if there are any more tables to analyze (360). If there are more tables, then steps 356-360 are repeated for each of the remaining tables. If there are no more tables, then the process 350 ends.

Figure 4:
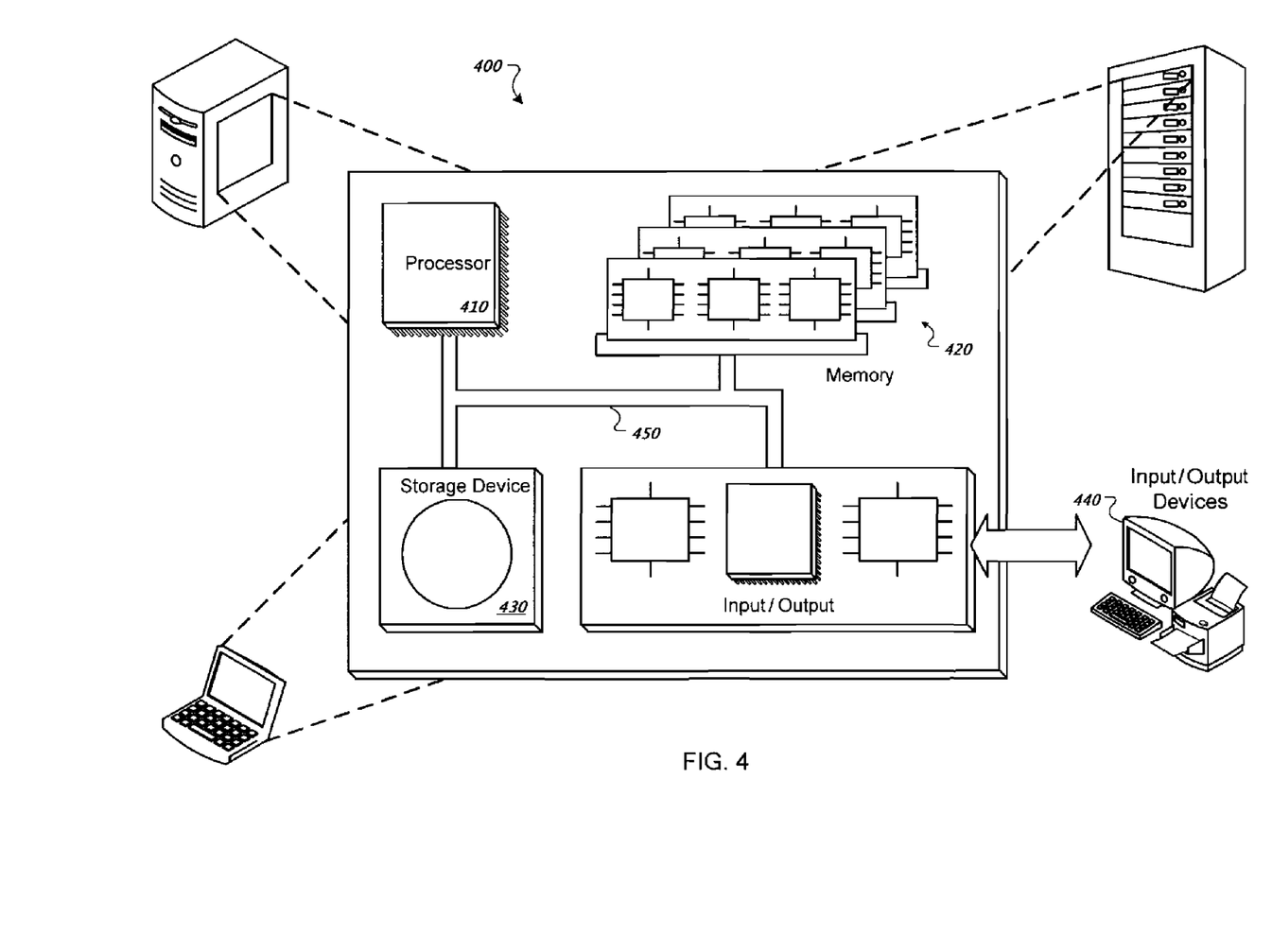
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. 5 The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a 10 volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
receiving a request to analyze how upgrading a preexisting database system to another version of the preexisting database system will affect components of the preexisting database system, the request identifying the preexisting database system and the other version of the preexisting database system;
identifying by a first computing device the components of the preexisting database system by analyzing configuration information for the preexisting database system, the configuration information for the preexisting database system being analyzed while the preexisting database system is operational, wherein the components of the preexisting database system comprise tables, fields, data types, indices, data elements, and attributes of the preexisting database system;
identifying by the first computing device components of the other version of the preexisting database system by analyzing configuration information for other version of the preexisting database system, wherein the components of the other version of the preexisting database system comprise tables, fields, data types, indices, data elements, and attributes of the other version of the preexisting database system;
determining by the first computing device changes to the components of the preexisting database system that upgrading from the preexisting database system to the other version of the database system will cause based upon a comparison of the identified components of the preexisting database system and the identified components of the other version of the preexisting database system;
generating a report indicating the determined changes; and
presenting the generated report.

2. The method of claim 1, wherein analyzing the configuration information for the preexisting database system comprises:

locating the configuration information for the preexisting database system;
identifying tables defined by the configurations information for the preexisting database system; and
for each of the identified tables, tracing definitions of fields, data types, indices, data elements, and attributes for the identified field across the configuration information for the preexisting database system to identify the components of the preexisting database system.

3. The method of claim 1, wherein analyzing the configuration information for the other version of the preexisting database system comprises:
locating the configuration information for the other version of the preexisting database system;
identifying tables defined by the configurations information for the other version of the preexisting database system; and
for each of the identified tables, tracing definitions of fields, data types, indices, data elements, and attributes for the identified field across the configuration information for the preexisting database system to identify the components of the other version of the preexisting database system.

4. The method of claim 1, wherein the preexisting database system is located on a second computing device that is different than the first computing device.

5. The method of claim 1, wherein the other version of the preexisting database system is located on a third computing device that is different than the first computing device and the second computing device.

6. The method of claim 5, wherein the first computing device, the second computing device, and the third computing device are communicatively connected via a computer network.

7. The method of claim 1, further comprising installing the other version of the preexisting database system on a computing device.

8. The method of claim 7, wherein the other version of the preexisting database system is installed as a demonstration of the other version.

9. The method of claim 1, wherein the other version of the preexisting database system is more recent than the preexisting database system.

10. The method of claim 1, wherein the generated report includes information regarding a level of severity for each of the determined changes.

11. The method of claim 1, wherein the generated report includes information regarding an estimated amount of time each of the determined changes will take when the preexisting database system is upgraded to the other version of the preexisting database system.

12. A computer program product tangibly embodied in a computer-readable storage medium and comprising instructions that when executed by a processor perform a method for managing planning of component requirements, the method comprising:
receiving a request to analyze how upgrading a preexisting database system to another version of the preexisting database system will affect components of the preexisting database system, the request identifying the preexisting database system and the other version of the preexisting database system;
identifying by a first computing device the components of the preexisting database system by analyzing configuration information for the preexisting database system, the configuration information for the preexisting database system being analyzed while the preexisting database system is operational, wherein the components of the preexisting database system comprise tables, fields, data types, indices, data elements, and attributes of the preexisting database system;
identifying by the first computing device components of the other version of the preexisting database system by analyzing configuration information for other version of the preexisting database system, wherein the components of the other version of the preexisting database system comprise tables, fields, data types, indices, data elements, and attributes of the other version of the preexisting database system;
determining by the first computing device changes to the components of the preexisting database system that upgrading from the preexisting database system to the other version of the database system will cause based upon a comparison of the identified components of the preexisting database system and the identified components of the other version of the preexisting database system;
generating a report indicating the determined changes; and
presenting the generated report.

13. The computer program product of claim 12, wherein analyzing the configuration information for the preexisting database system comprises:
locating the configuration information for the preexisting database system;
identifying tables defined by the configurations information for the preexisting database system; and
for each of the identified tables, tracing definitions of fields, data types, indices, data elements, and attributes for the identified field across the configuration information for the preexisting database system to identify the components of the preexisting database system.

14. The computer program product of claim 12, wherein analyzing the configuration information for the other version of the preexisting database system comprises:
locating the configuration information for the other version of the preexisting database system;
identifying tables defined by the configurations information for the other version of the preexisting database system; and
for each of the identified tables, tracing definitions of fields, data types, indices, data elements, and attributes for the identified field across the configuration information for the preexisting database system to identify the components of the other version of the preexisting database system.

15. The computer program product of claim 12, wherein the preexisting database system is located on a second computing device that is different than the first computing device.

16. The computer program product of claim 15, wherein the other version of the preexisting database system is located on a third computing device that is different than the first computing device and the second computing device.

17. The computer program product of claim 16, wherein the first computing device, the second computing device, and the third computing device are communicatively connected via a computer network.

18. A system comprising:
a computer network;
a first computing device configured to analyze how upgrading a preexisting database system to another version of the preexisting database system will affect elements components of the preexisting database system, the first computing device being connected to the computer network;

a second computing device on which the preexisting database system is located, the second computing device being communicatively connected to the first computing device over a computer network;

a third computing device on which the other version of the preexisting database system is located, the third computing device being communicatively connected to the first computing device over the computer network; and wherein the first computing device is further configured to:

receive a request to analyze how upgrading the preexisting database system to the other version of the preexisting database system will affect the components of the preexisting database system, the request identifying the preexisting database system on the second computing device and the other version of the preexisting database system on the third computing device;

identify the components of the preexisting database system by analyzing configuration information for the preexisting database system, the configuration information for the preexisting database system being analyzed while the preexisting database system is operational, wherein the components of the preexisting database system comprise tables, fields, data types, indices, data elements, and attributes of the preexisting database system;

identify components of the other version of the preexisting database system by analyzing configuration information for other version of the preexisting database system, wherein the components of the other version of the preexisting database system comprise tables, fields, data types, indices, data elements, and attributes of the other version of the preexisting database system;

determine changes to the components of the preexisting database system that upgrading from the preexisting database system to the other version of the database system will cause based upon a comparison of the identified components of the preexisting database system and the identified components of the other version of the preexisting database system;

generate a report indicating the determined changes; and present the generated report.

19. The system of claim 18, wherein analyzing the configuration information for the preexisting database system comprises:

locating the configuration information for the preexisting database system;

identifying tables defined by the configurations information for the preexisting database system; and for each of the identified tables, tracing definitions of fields, data types, indices, data elements, and attributes for the identified field across the configuration information for the preexisting database system to identify the components of the preexisting database system.

20. The system of claim 18, wherein analyzing the configuration information for the other version of the preexisting database system comprises:

locating the configuration information for the other version of the preexisting database system;

identifying tables defined by the configurations information for the other version of the preexisting database system; and for each of the identified tables, tracing definitions of fields, data types, indices, data elements, and attributes for the identified field across the configuration information for the preexisting database system to identify the components of the other version of the preexisting database system.

* * * * *